July 2, 1946.  G. A. GEDDES  2,402,957
AIRPLANE ROTARY WING
Filed Sept. 2, 1941  2 Sheets-Sheet 1

INVENTOR
George A. Geddes
BY Robert M. Dunning
ATTORNEY

July 2, 1946.  G. A. GEDDES  2,402,957
AIRPLANE ROTARY WING
Filed Sept. 2, 1941  2 Sheets-Sheet 2
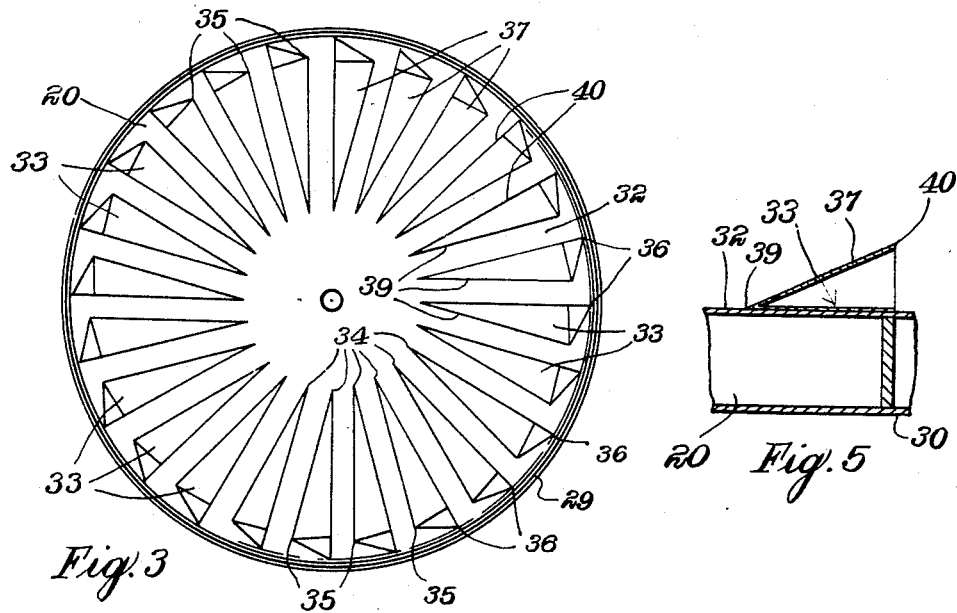
Fig. 3
Fig. 5
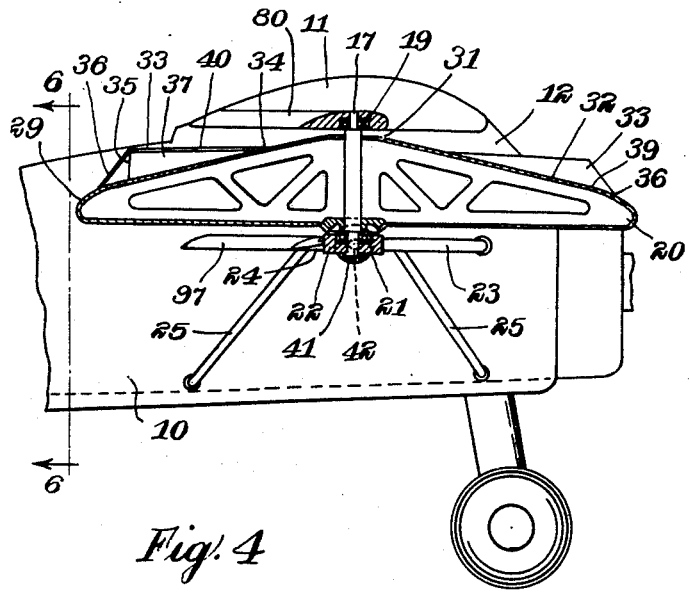
Fig. 4
INVENTOR
George A. Geddes
BY Robert M. Dunning
ATTORNEY Patented July 2, 1946

2,402,957

UNITED STATES PATENT OFFICE 2,402,957

AIRPLANE ROTARY WING

George A. Geddes, Minneapolis, Minn.

Application September 2, 1941, Serial No. 409,253

3 Claims. (Cl. 244—39)

My invention relates to an improvement in airplanes, wherein it is desired to provide a novel form of airplane capable of developing power as it moves through the air.

With the usual type of plane, wings are provided for holding the plane in the air, as the propeller creates forward movement of the plane. These wings are normally stationary, except for certain small surfaces thereof which may be used in controlling the plane. Attempts have been made to substitute for these wings, rotary blades which permit a more rapid vertical movement of the plane with respect to the forward movement thereof. With such constructions, planes have been able to take off and land almost vertically to permit maneuvering of the plane on a small landing area.

The present invention is not designed to accomplish the same result as these former constructions of planes which have been successfully produced. It is the object of the present invention to provide rotary wings which act to support the plane in its flight through the air and which are equipped with vanes to cause rotation of the wings during flight. The rotation of the wings does not hinder the supporting of the plane by the wings, but I have found that this rotation may be used to generate power which can either be used to run various appliances on the plane or to supply at least a portion of the power necessary to operate the plane.

While my invention is not limited to such structure, the construction lends itself particularly well to the operating of a plane by electrical power. It has been proposed to generate electrical power by any suitable means, such as by an internal combustion engine and to use this electrical power for operating the airplane propeller. The current generating means may operate through a system of batteries which will permit quiet operation of the plane when it is so desired. While the present construction would not detract from the noise of the rotating propeller, it would on occasion permit the plane to operate with the current generating motor turned off, thus rendering the plane operation very quiet.

A feature of my invention lies in the provision of one or more rotary wings upon the plane, which rotate due to wind pressure as the plane moves through the air, thus operating some desired mechanism such as electrical current generators. The wings are designed to extend substantially horizontal or downwardly inclined to some extent at the rear edge so as to assist in supporting the airplane. On the surface of the rotary wings a series of vanes are provided which cause rotation of the wings in one direction. Thus as the plane moves through the air the vanes cause a tendency for the wings to rotate in one direction. The wings are connected by any suitable connecting means and the power therefrom may be utilized.

It is an important feature of the present invention that less power is required to operate the plane than with other constructions with which I am familiar. Rotation of the wings is caused by movement of the plane through the air and this rotation does not hinder the movement of the plane through the air. A power is thus developed during movement of the plane, or while the plane remains stationary when the wind is blowing and this power may be used to assist in the operation of the plane.

A further feature of my invention resides in the provision of supporting means for supporting the wings so that they may rotate freely. This supporting means may be formed in the shape usual to an airplane wing so that the supports themselves may assist in keeping the plane aloft.

These and other objects and novel features of my invention will be more clearly and fully set forth in the following specification and claims.

In the drawings forming a part of my specification:

Figure 3 is a top plan view of one of the rotary wings of my airplane.

Figure 4 is a diagrammatic cross-sectional view through one of the rotary wings, illustrating the construction thereof.

Figure 5 is a sectional view through a portion of a wing and one of the rotary vanes mounted thereupon.

Figure 2:
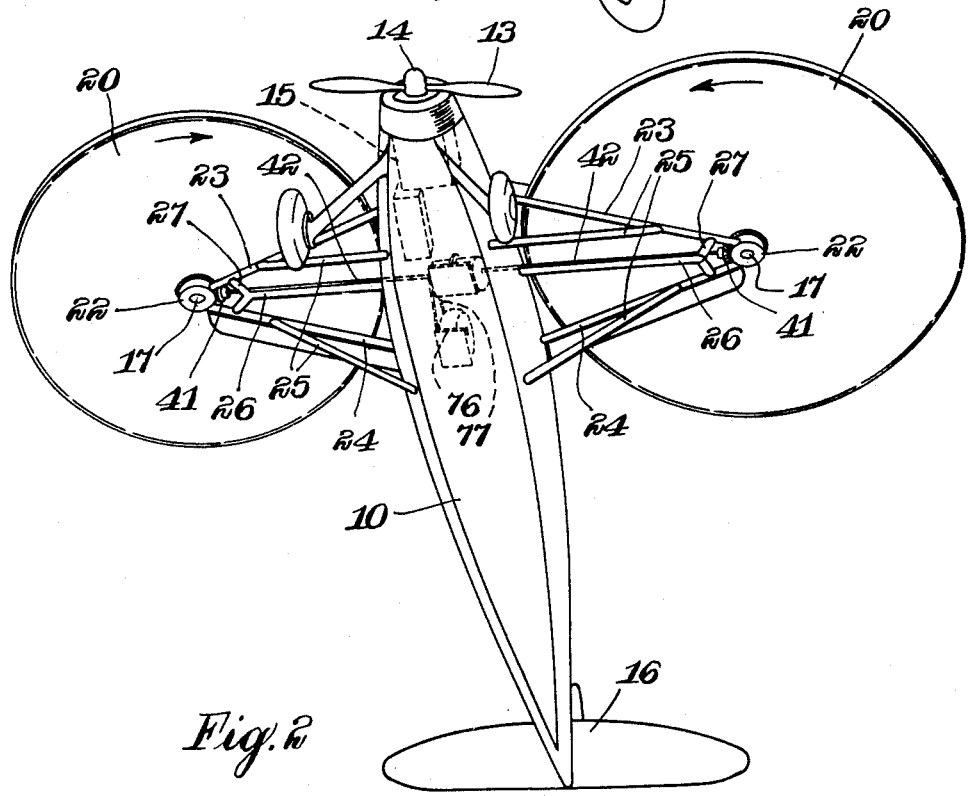
Figure 2 is a perspective view of my airplane showing a portion of the bottom of the same.

The airplane A includes a fuselage 10 from the opposite sides of which extend wings 11. The wings 11 are preferably shorter than the wings ordinarily used to support a fuselage of the size illustrated. A glass enclosed pilot's compartment 12 is formed between the wings 11, and the propeller 13 is shown mounted upon the propeller hub 14 which is rotated by the airplane motor 15 illustrated in Figure 2.

A tail assembly 16 of any preferred or desired shape is shown secured to the rear end of the fuselage 10 for controlling and operating the plane. Substantially vertical pivots 17 are provided with a bearing 19 near the ends of the wings 11 to support the rotary wings 20 forming a part of the present invention.

The wings 20 are supported on the pivot shafts 17, which in turn are supported by the bearings 19 and by suitable outboard bearings 21 in the supporting hubs 22. The supporting hubs 22 are supported by forwardly extending braces 23 and rearwardly extending braces 24 which in turn are supported by downwardly inclined braces 25. A central brace 26 is also provided which is connected to the braces 23 and 24 by a Y-shaped connecting end 27. The above described braces are only illustrative of types of braces which may be used to accomplish the desired purpose, and a different arrangement of braces may be provided if it is deemed advisable.

The rotary wings 20 are provided with a rounded peripheral edge 29 which is similar in shape to the forward edge of a conventional airplane wing. The lower surface 30 of each wing 20 is substantially flat, while the upper surface of the wing slopes upwardly to the thickest portion of the wing 31 which is at the center of the wing. The wing is formed of a surface skin element connected by internal ribs of any desired type.

Mounted upon the upper surface 32 of each rotary wing 20, I provide a series of vanes 33. These vanes are pockets in which the wind may catch to rotate the wing. Each pocket 33 tapers from a point 34 substantially flush with the upper surface 32 of the wing to the widest part 35 from where the pocket slopes to the forward pointed pocket end 36. The upper surface of each pocket 33, which is indicated by the numeral 37, is connected along an edge 39 to the wing surface 32, while the opposite edge 40 of each of the pockets is a free edge and is spaced substantially from the surface 32, as illustrated in Figures 4 and 5 of the drawings.

Figure 1:
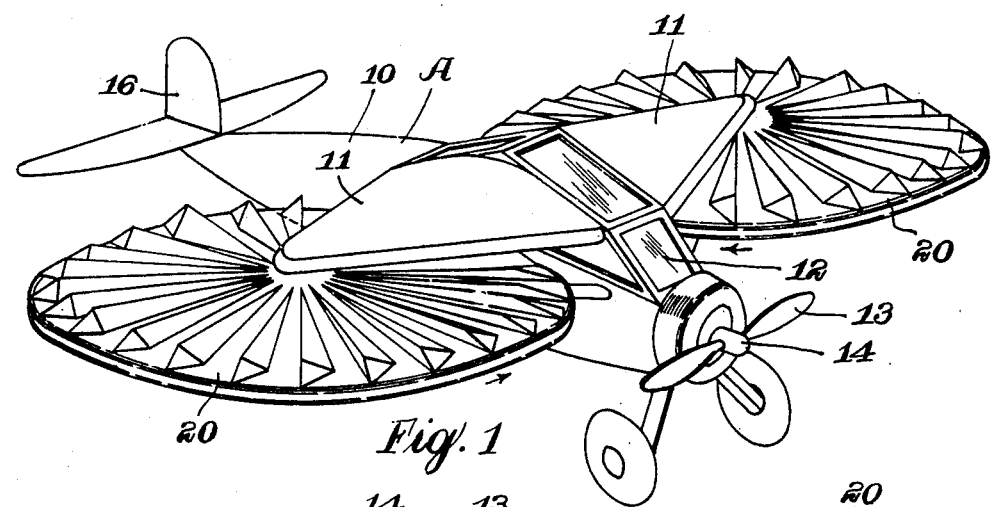
Figure 1 is a perspective view of my airplane in operation.

The inclined surfaces 37 form relatively little resistance to wind on one side of the center of the wheel, while the pockets 33 catch the wind on the other side of the wheel center to cause rotation of the wheel-shaped wing. Each wing 20 is thus caused to rotate rapidly as the plane travels through the air, the wind catching in the pockets on one side of the wheel during movement of the plane, and the wind sliding over the pockets 33 on the other side of the center of the wing. In the plane illustrated in Figure 1 of the drawings, the rotary wing 20 to the left of the fuselage will rotate in a counter-clockwise direction, while the wing to the right of the fuselage in this figure will operate in a clockwise direction.

Each of the rotary wings 20 is provided with a gear recessed into the lower surface 30 thereof about the pivot 17, and this gear meshes with a cooperating gear 41 on a substantially horizontally extending shaft 42. Each shaft 42 extends into the fuselage 10. The shafts 42 drive a suitable transmission which selectively connects the rotor wings with a motor-generator 76 through a chain 77.

In accordance with the patent statutes, I have described the principles of construction and operation of my airplane, and while I have endeavored to set forth the best embodiments thereof, I desire to have it understood that obvious changes may be made within the scope of the following claims, without departing from the spirit of my invention.

I claim:

1. A rotor wing for an airplane comprising a disc-shaped body symmetrical with respect to a central axis of rotation, said body having a substantially flat under surface, a convex upper surface, and a rounded, convex rim portion smoothly interconnecting said under and upper surfaces, generally radially extending elongated vanes arranged in angularly spaced relation mounted on said upper surface, said vanes forming pockets facing in a direction opposite to the normal direction of rotation of the rotor wing, each of said vanes including a peripheral end wall closing the outer end of the pocket, each of said pockets tapering in cross section from a minimum at its innermost point to a maximum at its peripheral terminus, each of said end walls generally merging into said rim portion.

2. A rotor wing for an airplane comprising a disc-shaped body symmetrical with respect to a central axis of rotation, said body having a substantially flat under surface, a convex upper surface, and a rounded, convex rim portion smoothly interconnecting said under and upper surfaces, generally radially extending elongated vanes arranged in angularly spaced relation mounted on said upper surface, said vanes forming pockets facing in a direction opposite to the normal direction of rotation of the rotor wing, each of said vanes including a peripheral end wall closing the outer end of the pocket, each of said pockets tapering in cross section from a minimum at its innermost point to a maximum at its peripheral terminus, the section in a generally radial plane being triangular, and each of said end walls generally merging into said rim portion.

3. A rotor wing for an airplane comprising a disc-shaped body symmetrical with respect to a central axis of rotation, said body having a substantially flat undersurface, a convex upper surface, and a rounded, convex rim portion smoothly interconnecting said under and upper surfaces, generally radially extending elongated vanes arranged in angularly spaced relation mounted on said upper surface, said vanes forming pockets facing in a direction opposite to the normal direction of rotation of the rotor wing, each of said vanes including a peripheral end wall closing the outer end of the pocket, each of said pockets tapering in cross-section from a minimum at its innermost point to a maximum at its peripheral terminus, the cross section at each point being triangular, and each of said end walls generally merging into said rim portion.

GEORGE A. GEDDES.